3,255,528
MEASURING DEVICE
Jerzy Brynk, Raton, N. Mex., assignor to A.R.F. Products, Inc., River Forest, Ill., a corporation of Illinois
Filed Feb. 5, 1963, Ser. No. 256,425
12 Claims. (Cl. 33—1)

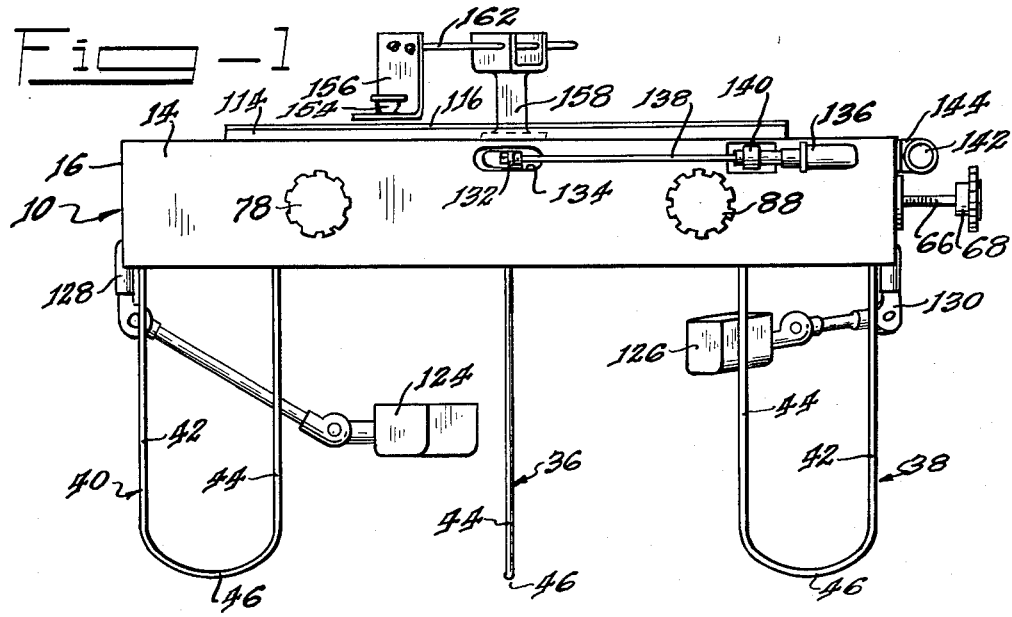
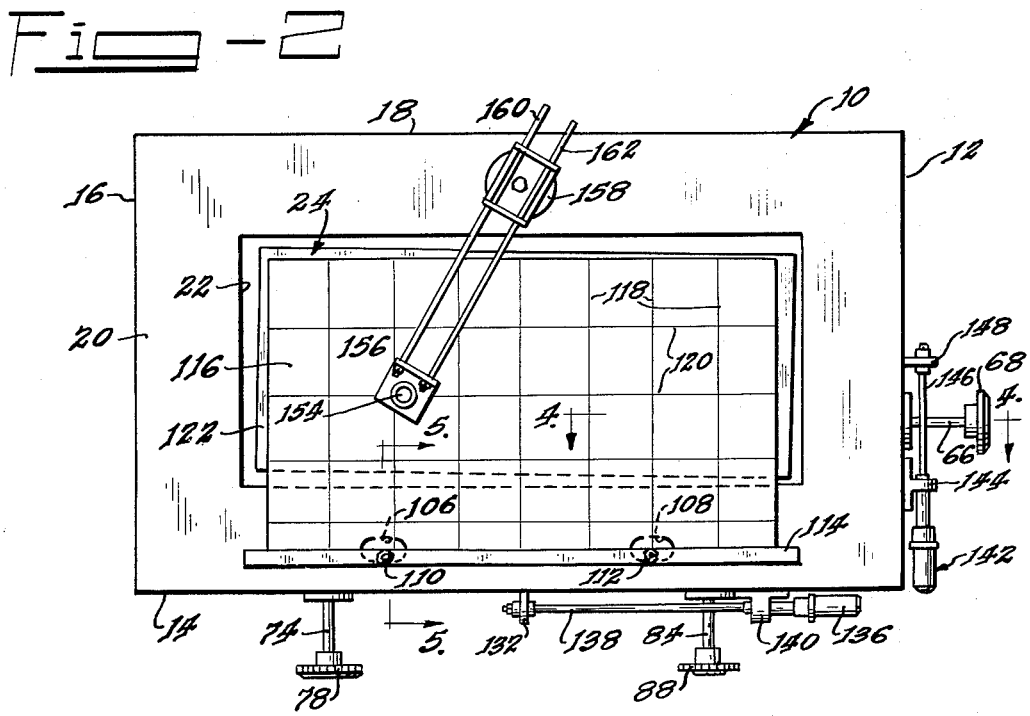

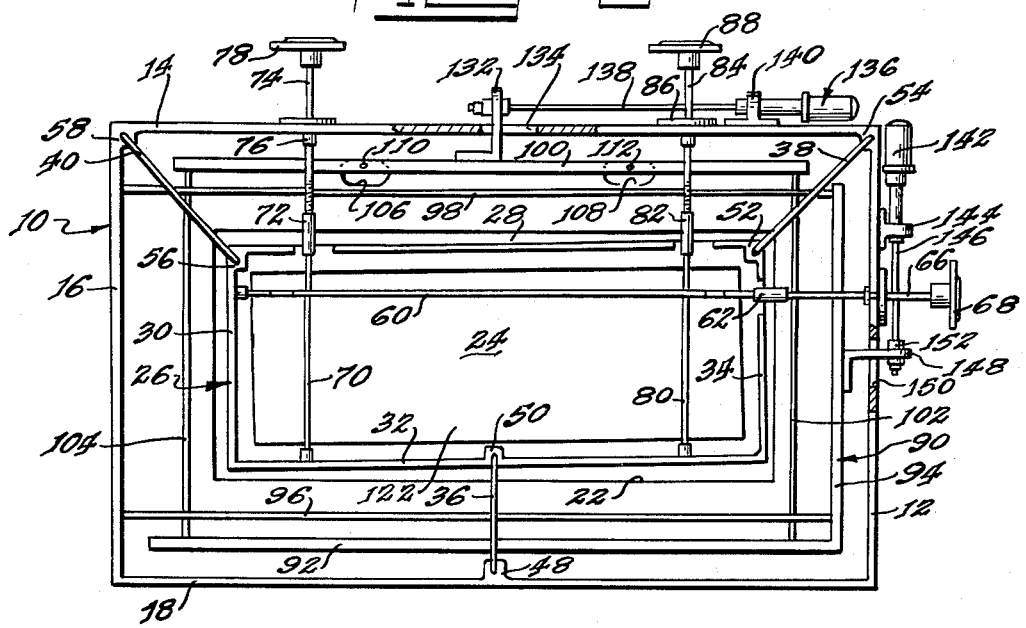
Fig-3
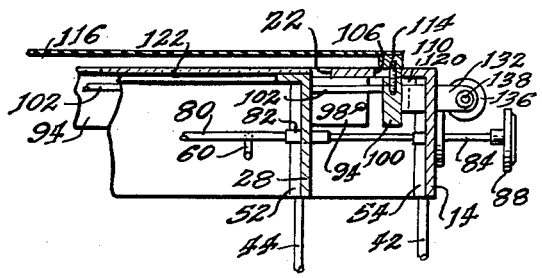
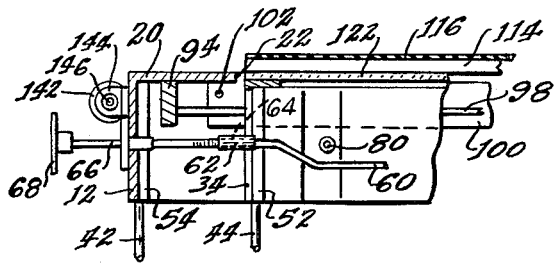
Fig-4
Fig-5
Inventor
Jerzy Brynk
Stone, Nierman,
Burmeister & Zummer
Attorneys

United States Patent Office 3,255,528
Patented June 14, 1966

The present invention relates to devices for measuring distances between two points on a flat surface or member, and more particularly, it relates to devices for determining the coordinates of a point on a flat surface relative to a reference point.

It is often necessary to measure the distance between two points on a flat surface. The accuracy of a geometric configuration disposed in art work may be checked in this manner. Also, mechanical devices, such as printed circuit boards, may be directly checked, and other mechanical devices reduced to a flat surface and checked in a similar manner. The present invention is directed to a device which facilitates measurement of distances between two fixed points on a flat surface.

Prior to the present invention, an optical instrument has been known in which a microscope is mounted and translatable within a keyed track, and this track itself is mounted on a second track for translation normal to the first track. In this manner, the relative position of the second track to the first track will determine one axis of a point within the view of the microscope, and the position of the microscope on the first track determines the other coordinate of this point. With this type of equipment, the two coordinates of a second point may be also determined, and the distance between the two points arithmetically calculated.

It is an object of the present invention to provide a measuring device for use on a flat surface with which the distance between two points on the flat surface may be directly measured, thus eliminating the need for calculation.

It is a further object of the present invention to provide an improved instrument for measuring distances between points on a flat surface more rapidly than prior devices.

In addition, it is an object of the present invention to provide an instrument for measuring the distance between points on a flat surface of simpler design and lower cost than prior known devices for accomplishing this purpose.

These and further objects of the present invention will become readily apparent to those skilled in the art from a further consideration of this specification, particularly when viewed in light of the drawings, in which:

FIGURE 1 is a front elevational view of a measuring device constructed according to the teachings of the present invention;

FIGURE 2 is a plan view of the measuring device of FIGURE 1;

FIGURE 3 is a bottom view of the measuring device of FIGURES 1 and 2;

FIGURE 4 is a sectional view taken along the line 4—4 of FIGURE 2; and

FIGURE 5 is a sectional view taken along the line 5—5 of FIGURE 2.

As indicated in the figures, the measuring device has a supporting frame 10 with four flat walls 12, 14, 16, and 18 disposed normal to a flat top 20. The four walls 12, 14, 16, and 18, are interconnected at their ends to form a rectangular structure, and the top 20 extends from the edge of these walls and is provided with a rectangular opening 22 symmetrically disposed relative to the four walls. A table 24 is disposed within the opening 22 of the frame 10. The table 24 is also rectangular in shape and has a frame 26 with side members 28, 30, 32 and 34 in the form of elongated strips which are interconnected at their ends to form a rectangular frame. The table 24 is mounted on the frame 10 by three U-shaped springs 36, 38 and 40. Each of the springs 36, 38 and 40 has a pair of straight legs 42 and 44 and a curved portion 46 which extend between the legs 42 and 44. One of the legs 42 of the spring 36 is mounted on a boss 48 which extends inwardly from the central portion of the wall 18 of the frame, and this leg 42 extends from the frame 10 normal to the surface or top 20 thereof. The other leg 44 of the spring 36 is mounted on a corresponding boss 50 located centrally of the side member 32 of the frame 26 of the table 24.

In like manner, the spring 38 has one leg 44 mounted on a boss 52 disposed at the junction of the side members 34 and 28 of the frame 26 of the table, and the other leg 42 of the spring 38 is mounted on a boss 54 disposed at the intersection of the wall 12 and 14 of the frame 10. Also, the spring 40 has one leg 44 mounted on a boss 56 located at the junction of the side member 28 and 30 of the frame 26 of the table 24, and the other leg 42 mounted on a boss 58 located at the junction of the walls 14 and 16 of the frame 10. The springs 36, 38 and 40 all extend normally from the top 20 of the frame 10 an equal distance so that the curved portions 46 of the three springs 36, 38 and 40 are adapted to rest upon a horizontal surface and place the top 20 of the frame 10 also on a horizontal surface. Also, the legs 42 and 44 of the springs 36, 38 and 40, are resiliently held in parallel relationship and may be readily deflected relative to each other, so that the table 24 may be both rotationally and translationally displaced relative to the frame 10.

As indicated in FIGURES 3 and 5, a first rod 60 is disposed parallel to the table 24 and has its one end mounted on the side member 30, and the rod 60 is neither translatable nor rotatable relative to the side member 30. The other end of the rod 60 is secured within a bushing 62 which has a threaded channel 64 extending longitudinally in alignment with the first rod 60. A first shaft 66 is journaled within the wall 12 of the frame 10 in alignment with the bushing 62, and one end of the first shaft 66 is threaded and disposed in threaded engagement within the channel 64 of the bushing 62. A knob 68 is affixed at the other end of the first shaft 66 exterior to the wall 12 of the frame 10.

In like manner, a second rod 70 is mounted on the side member 32 between the spring 36 and the junction of the side member 30 and the side member 32. This second rod 70 extends toward the wall 14 of the frame 10 and is secured within a bushing 72. A second shaft 74 threaded at one end threadedly engages a threaded channel within the bushing 72, and the second shaft 74 is journaled on the wall 14 of the frame 10 by bearings 76 and has a knob 78 at its end opposite the second rod 70. A third rod 80 is also mounted on the side member 32 between the spring 36 and the junction of the side member 30 and the side member 32, and this rod also extends toward the wall 14. The end of the third rod 80 opposite the side member 32 of the table 24 is secured within a third bushing 82, and a third shaft 84 has a threaded end disposed and threadedly engaging a threaded channel of the bushing 82. The third shaft 84 is journaled within the wall 14 by a bearing structure 86, and a knob 88 is secured on the end of the third shaft 84 opposite the third rod 80. The rods 70 and 80 are disposed generally parallel to each other and generally normal to the side member 32. In like manner, the rod 60 is disposed generally normal to the rods 70 and 80 and normal to the side member 34 of the table, but the rods 60, 70 and 80 are subject to deflection normal to the axis of the rods to permit the table 24 to be moved within the opening 22 in the top 20 of the frame 10.

A rigid angle 90 is mounted between the table 24 and the frame 10, and this angle 90 has two legs 92 and 94 which are straight and disposed normal to each other. The one leg 92 is disposed between the side member 32 of the frame 26 of the table 24 and the wall 18 of the frame 10. The other leg 94 is mounted on the end of the leg 92 and normally thereto, and is disposed between the side member 34 of the frame 26 of the table 24 and the wall 12 of the frame 10. Two elongated bars 96 and 98 are mounted at one end on the wall 16 of the frame 10 and extend generally parallel to each other to terminate in a rigid mounting on the leg 94 of the angle 90. One of the bars 96 is disposed adjacent to the leg 92 of the angle 90, and the other bar 98 is affixed to the end of the leg 94 remote from leg 92. The two bars 96 and 98 permit the leg 94 to be translated along its axis but resist movement of the leg along the longitudinal axis of the bars 96 and 98.

A straight rib 100 with a rectangular cross-section is disposed between the wall 14 of the frame 10 and the side member 28 of the table 24, and this rib 100 is mounted on the leg 92 of the angle 90 by two rod shaped strips 102 and 104 which are disposed parallel to each other and extend between the ends of the rib 100 and the leg 92 of the angle 90. The strips 102 and 104 also permit translation of the rib along its longitudinal axis but resist translation of the rib 100 normal to the longitudinal axes of the rib 100.

The top 20 of the frame 10 has two openings 106 and 108 which are spaced from each other and confront the rib 100. A pair of pins 110 and 112 are anchored at one end on the rib 100 and extends through the openings 106 and 108, respectively, normal to the rib 100, and a linear strip 114 is mounted on the end of the pins 110 and 112 opposite the rib 100. The strip 114 forms a spacer member and abuts the top 20 of the frame 10 on one side, thus assuring the position of the rib 100 relative to the frame 10. The spacer strip 114 is slideably disposed on the top 20 of the frame 10, and carries a transparent sheet 116 which extends from the strip 114 over the entire surface of the table 24. The transparent sheet 116 contains two groups of spaced lines designated 118 and 120. These lines may be considered generally as spaced apart by distances equal to successive values of the dependent variable of a mathematical function calculated by independent variables progressing by equal increments. In the embodiment illustrated these lines are shown in one form as spaced apart by equal distances. Thus the lines of the group 120 are spaced apart by the same distance as the lines of the group 118 and are normal to the lines of the group 118. Also, the lines of the group 118 are disposed normal to the strip 114 and the lines of the group 120 are disposed parallel to the strip 114.

The frame 26 of the table 24 also supports a rectangular flat member 122 which is adapted to support a work piece. The member 122 is preferably transparent or translucent to permit light to be transmitted from the lower side of the table through to the transparent sheet 116, and is preferably clouded for diffusing of this light. A pair of fluorescent lamps 124 and 126 are mounted by means of brackets 128 and 130 on the walls 12 and 16 of the frame 10, respectively. The fluorescent lamps 124 and 126 are disposed beneath the table 24 so that illumination penetrates the flat base 122 of the table 24 to illuminate the transparent sheet 116. These lamps have been omitted from the showing of FIGURE 3 in order not to unduly confuse the showing of this view.

A bracket 132 is mounted centrally on the rib 100 and extends through an aperture 134 in the wall 14 of the frame 10. The end of the bracket 132 opposite the rib 100 is mounted on the end of a micrometer 136 which has its measuring rod 138 disposed parallel to the axis of rib 100. The micrometer 136 therefore is capable of measuring longitudinal displacement of the rib 100, and hence longitudinal displacement of the transparent sheet 116. The micrometer 136 is mounted on the wall 14 by means of a bracket 140.

A second micrometer 142 is mounted on the wall 12 by means of a bracket 144. The measuring rod 146 of the micrometer 142 is disposed parallel to the longitudinal axis of the leg 94 of the angle 90, and a bracket 148 is mounted on the leg 94 and extends through an aperture 150 in the wall 16.

The work piece which contains points whose distances are to be measured or whose coordinates are to be determined relative to a fixed point, is placed upon the upper surface of the table 24 and secured in position, for example by masking tape, not shown. In mounting the work piece, it is preferable to mount the work piece to bring the reference point as near to a selected reference point on the transparent sheet 116 as dexterity will permit, and to do so with the micrometers 136 and 142 positioned in their zero positions. As indicated in the figures, the sheet 116 is secured on the strip 114, but is flexible to permit the work piece to be inserted between the sheet 116 and the surface of the table 24. A non-flexible sheet 116 may also be employed, and a pivotal mounting provided between the sheet and the strip 114.

One of the points of the work piece which is selected as a reference point is thus brought into alignment with a reference point on the transparent sheet 116. The selected point on the transparent sheet 116 may be arbitrarily selected or may be selected as the zero point of the two coordinate system formed by the groups 118 and 120 of parallel lines. To aid in the visual observation of the position of a point on the work piece with a line on the transparent sheet 116, a magnifier 154 is mounted on the end of a rotatable arm 156, and the arm 156 is mounted on a bracket 158 by means of two rods 160 and 162 which may be translated relative to the bracket so that the magnifier 154 may be positioned in any location confronting the transparent sheet 116.

The table 24 is physically moved relative to the frame 10 to bring the reference point of the work piece into alignment with the reference point of the transparent sheet 116. Movement of the table is initiated and controlled by rotationally positioning the knobs 68, 78 and 88 while observing coincidence of the reference point of the work piece with the reference point of the transparent sheet 116. Further, an entire axis of the work piece, such as the axis between the two points to be measured, may become aligned with the reference axis of the transparent sheet 116, since the table 24 may not only be positioned symmetrically within the rectangular opening 20 of the frame 10, but may be rotated throughout a slight angle relative thereto. The magnifier 154 is thereupon positioned over the point to be measured relative to the reference point, and the most significant digits locating the coordinates of the point to be measured are read directly from the two groups 118 and 120 of lines on the transparent sheet 116. Thereafter, the micrometers 136 and 142 are rotated to move the transparent sheet to position the nearest intersection of a line of the group 118 with a line of the group 120, and the point to be measured. The readings of the two micrometers 136 and 142 thereupon become the least significant digits of the coordinates of the point to be measured and the measurement is complete. It is, of course, necessary that the nearest intersection of a line of the group 118 and a line of the group 120 which is aligned with the point under measurement be in a positive direction, or the measurements of the micrometers must be subtracted from the coordinates obtained from visual observation of the transparent sheet 116.

In one particular construction of a measuring device according to the teachings of the present invention, the table 24 may be translated within the opening 22 of the frame 10 a distance of about one-fourth inch in each of the two coordinate directions, and may be rotated within the opening 22 throughout an angle of approximately three degrees. The transparent sheet 116 is constructed of Estar film, and the lines of the group 118 and 120 are spaced from each other by a distance of one one-hundredth of an inch. The transparent sheet 116 may also be constructed of glass and will provide greater accuracy when so constructed.

It is to be noted that measurements may be performed in a simple and direct manner by use of the measuring device described above. Also, accuracy of the instrument does not depend upon the accuracy of adjustment devices except for the very accurate micrometers. Further, while the foregoing embodiment of the invention utilizes the springs 36, 38 and 40 as legs for supporting the frame 10, it is clearly within the contemplation of the present invention to employ separate legs for mounting the frame and separate springs for mounting the table 24 on the frame 10.

Those skilled in the art will readily devise many modifications of the present invention within the intended scope thereof. Further, many applications of the present invention will become apparent to those skilled in the art from the foregoing disclosure. It is therefore intended that the scope of the present invention be not limited by the foregoing disclosure, but rather only by the appended claims.

What is claimed is:

1. A device for measuring the distance from one point to another point in an object comprising: a flat table adapted to hold said object, a rectangular coordinate measuring surface mounted parallel to said flat table, means constraining said surface to rectangular movement in a plane parallel to said table, a plurality of intersecting grid lines in said surface spaced by distances equal to successive values of the dependent variable of a mathematical function calculated by independent variables progressing by equal increments, said grid line intersections forming a plurality of spaced crosspoints, means for aligning the one point in said object with a crosspoint in said surface to comprise a start position for measurement, wherein the spacings between the grid lines serve to measure the distance from said start position to a crosspoint adjacent to the other point in said object.

2. A device as claimed in claim 1, in which said measuring surface comprises a transparent grid sheet superimposed over said object and said table, in which said table is translucent to pass light through said surface, and wherein said one point in said object is visually aligned with said start position crosspoint and said other point is also observed visually with respect to other crosspoints in said grid sheet for measurement.

3. A device for measuring distance from a point on a surface of an object comprising: a flat table adapted to hold said object, a rectangular coordinate measuring surface mounted parallel to said flat table, said measuring surface comprising a transparent rectangular grid sheet, said grid sheet including a plurality of intersections individually selectable for visual alignment with the point in said surface to provide a start position for measurement, means constraining said measuring surface to rectangular movement in a plane parallel to said table, and calibrated indicating means responsive to movement of said measuring surface from said start position to effect a visual indication of the amount of movement of said measuring surface from said start position in rectangular coordinates.

4. A device for measuring the coordinate distance between a first point in an object and another point in said object comprising: a planar table adapted to hold the object, a frame, means securing said table on said frame in a manner allowing controlled movement in the plane of said table, a measuring plate mounted on said frame, means constraining said measuring plate to movement in a first direction parallel to the plane of said table and in a second direction normal to said first direction and parallel to the plane of the table, means for adjustably sliding said table within its plane of movement to position said table with the object first point in alignment with the measuring plate at a measuring start position, means for moving said measuring plate from said start position to another position adjacent to the other point in said object, and means responsive to movement of said measuring plate from said start position to said other position for indicating the amount of movement of said measuring plate in said first and second directions.

5. A device as claimed in claim 4, in which said table securing means comprises a plurality of arcuate support members extending between said table and said frame, said support members configured to allow deflection of said table only in a plane parallel to said table.

6. A device as claimed in claim 5, in which said support members each comprise a substantially U-shaped rod with the ends of the U firmly affixed to the table and frame respectively, in which the legs of the U extend substantially normally from the table plane, and in which the base of each U-shaped rod is adapted to rest on a floor to space the table a distance above the floor.

7. A device for measuring distances from a point in an object comprising: a rectangular frame including a plurality of sidewalls, a planar table adapted to hold said object, said table mounted on said frame for controlled movement in a plane parallel to the plane of said table, a measuring member secured to one of the sidewalls of said frame and movable only in a plane parallel to the plane of said table, reference indicia linked to said member for movement therewith, a plurality of individually adjustable supports securing said table to said frame for moving said table a controlled amount with respect to the frame sidewalls for aligning said point in said object with said reference indicia, means for moving said reference indicia in a direction parallel to the sidewall to which the measuring member is secured, means for moving said reference indicia in a second direction normal to the first direction in the plane parallel to the plane of said table, and indicating means responsive to the movement of said reference indicia in said first and second directions for measuring the amount of movement of said reference indicia from alignment with the point in said object.

8. A device for measuring the distance from a first point in an object to a second point in the object comprising: a rectangular frame including a plurality of joined sidewalls, a planar table adapted to hold said frame, said table mounted on said frame for adjustable movement in a plane parallel to the plane of said table, a reference frame connected to one of said sidewalls and movable in a plane parallel to the plane of said table, a rectangular coordinate grid sheet including a plurality of rectangular equally spaced intersections, said grid sheet secured to said reference frame for joint movement therewith, a plurality of individually adjustable supports securing said table to said rectangular frame for movement of said table with respect to both said frames for aligning said first point with a selected intersection on said grid sheet to provide a start measuring position, means for moving said grid sheet in a first direction parallel to the sidewall to which the reference frame is connected in the plane of movement of said reference frame and in a second direction normal to said first direction in the plane of movement of said reference frame until an intersection on said sheet is aligned with said second point, and calibrated indicating means responsive to said reference frame movement for indicating in rectangular coordinates the amount of movement of said reference frame from said start position, wherein the distance from said first to said second point is measured in rectangular coordinates comprising the algebraic sum of the spacings from said start position to the position of said second point on the grid sheet and on the indications from indicating means in the first and the second directions summed individually for each of said directions.

9. A device for measuring the distance from one point in an object to another point in the object comprising: a planar table adapted to hold thereon said object, a transparent coordinate measuring plane mounted parallel to said table above said table, a plurality of intersecting grid lines in said measuring plane forming a plurality of spaced crosspoints, means for moving the table in its plane to move said object held thereby to align said one point in the object with a crosspoint in said measuring plane to comprise a start position for measurement, a magnifying lens, means mounting said lens for movement in a plane parallel to said table plane whereby said lens may be positioned over said crosspoint to more accurately control the alignment of said point and said crosspoint at the start position, and means constraining said measuring plane to controlled rectangular movement in its plane to visually align said other point in said object with another crosspoint in said plane to complete said measurement, whereby said lens may be moved to said other crosspoint to more accurately control the alignment at said measurement completion.

10. A device for measuring the distance from one point in an object to another point in the object comprising: a translucent planar table adapted to hold thereon said object, a transparent coordinate measuring plane mounted parallel to said table above the table and the object held thereon, a plurality of intersecting spaced grid lines in said measuring plane forming a plurality of spaced crosspoints, means for moving the table in its plane to align said one point in said object with a crosspoint to comprise a visually set start position for measurement, illuminating means disposed below said table for transmitting light through said translucent table and said transparent measuring plane to facilitate the visual setting of the alignment in said start position for measurement, and means constraining said measuring plane to rectangular movement in its plane for alignment of a crosspoint with said other point in the object to complete the measurement at a visually set final position.

11. A device for measuring the distance from one point in an object to another point in the object comprising the combination of claim 9 in combination with means for measuring separately the motion of the measuring plane along each of the axes of rectangular movement thereof.

12. A device for measuring the distance from one point to another point in an object comprising: a flat table adapted to hold said object, a rectangular coordinate measuring surface mounted parallel to said flat table, means constraining said surface to rectangular movement in a plane parallel to said table, a plurality of intersecting grid lines in said surface spaced by distances equal to successive values of the dependent variable of a mathematical function calculated by independent variables progressing by equal increments, said grid line intersections forming a plurality of spaced crosspoints, all of the crosspoints of said grid line being in the field of view, mean for aligning the one point in said object with a crosspoint in said surface to comprise a start position for measurement, and means for directly indicating the magnitude of movement of the coordinate measuring surface along each of its two axes of movement, wherein the spacings between the grid lines serve to measure the distance from said start position to a crosspoint adjacent to the other point in said object, and the indications of the movement of the coordinate measuring surface determine the distance said adjacent crosspoint is disposed from the other point in said object.

References Cited by the Examiner

UNITED STATES PATENTS

| | | | |
|---|---|---|---|
| 2,034,529 | 3/1936 | Olsen | 33—184.5 |
| 2,198,757 | 4/1940 | Bohrn et al. | 33—1 |
| 2,999,315 | 9/1961 | Benson | 33—1 |

ISAAC LISANN, *Primary Examiner*.